(No Model.)
C. D. HAMMON.
TIRE TIGHTENER.
No. 347,347. Patented Aug. 17, 1886.
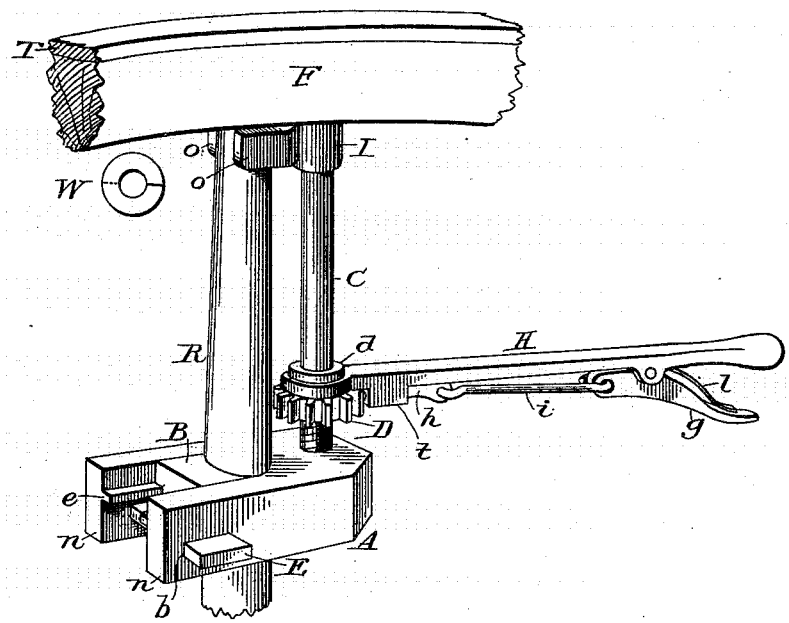
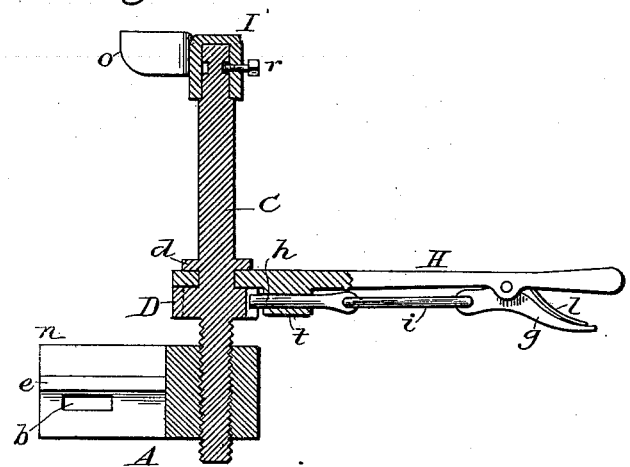
Witnesses:
James F. DuHamel
Walter S. Dodge
Inventor:
C. D. Hammon,
by Dodge & Son
Attys

UNITED STATES PATENT OFFICE.

CLARENCE D. HAMMON, OF DELAVAN, MINNESOTA.

TIRE-TIGHTENER.

SPECIFICATION forming part of Letters Patent No. 347,347, dated August 17, 1886.

Application filed April 29, 1886. Serial No. 200,512. (No model.)

*To all whom it may concern:*

Be it known that I, CLARENCE D. HAMMON, of Delavan, in the county of Faribault and State of Minnesota, have invented certain new and useful Improvements in Tire-Tighteners, of which the following is a specification.

My invention relates to the tightening of the tires on wheels for wagons, &c.; and the invention consists of a device that can be attached to the spokes of the wheel, and be made to expand the rim or the felly of the wheel, to enable washers to be inserted between the end of the spoke and the felly, and thereby tighten the tire, as hereinafter more fully described.

Figure 1 is a perspective view showing the device and the manner of using the same. Fig. 2 is a side elevation of the device shown detached and partly in section.

It is well known that the tires of wheels used on wagons and other vehicles become loose from two causes—one being the shrinkage of the wood composing the wheel with more or less wear in the joints thereof, and the other being the expansion of the tire by use, and especially by the constant hammering to which it is subjected when used on stony roads or the stone pavements of streets. In such cases, if the tire be not tightened the wheel will soon be destroyed. The usual method is to remove the tire from the wheel and reduce its size either by cutting it and then lapping and welding the ends, or by upsetting the tire. Machines have also been devised by which the tire could be upset or compressed while on the wheel; but all these methods necessitate the taking of the wheel or wheels to a shop, often at a distance, and consequently involve considerable travel, loss of time, and expense. This is more especially the case with farmers or persons residing in the rural districts, and to whom the time required to visit a shop at a distance, especially in the busy season of haying and harvesting, when the tires are more likely to become loose on account of the hot dry weather, is a matter of importance.

The object of my invention is to provide means whereby the wheels can be rendered tight by the owner at his home or wherever he may chance to be, and by the use of which blacksmiths and others can quickly tighten up a wheel without removing the tire, and without removing the wheel from the vehicle, if desired, and which shall be cheap and so simple that any person of ordinary intelligence can use it.

To accomplish these results I construct a device as follows: I provide a clamp that can be fastened to a spoke of the wheel, this clamp consisting of a metal block, A, of the proper form and size to embrace or straddle the spoke R, as shown in Fig. 1, its arms $n$ projecting far enough to receive a loose block, B, which has its inner face made concave to fit against the spoke, and which is crowded tight against the spoke, and is held in place by a wedge, E, inserted in rear of the block B through holes $b$ in the arms $n$ of block A, as shown in Fig. 1, there being ribs $e$ and corresponding grooves on the adjoining faces of the arms $n$ and block B, to prevent any independent vertical movement of the parts A and B, the clamp being preferably made of considerable depth so as to have a large bearing on the spoke, to prevent the latter from being bruised or indented when force is applied, as hereinafter explained. A hole with a screw-thread is formed in the head or solid portion of the block A, as shown in Fig. 2, and in this is fitted a bolt or strong metal rod, C, provided at its lower end with a corresponding screw-thread, and at its opposite end with a bearing-block, which, like the block A, has arms $o$ to straddle the spoke R and bear against the inner face of the felly F, as shown in Fig. 1. The rod or bolt C is secured to the bearing or push block I in any suitable manner, so as to be free to turn therein, a simple method being to make an annular groove in the tenon or journaled portion of the rod where it fits in the block I, and arrange a screw, $r$, in a transverse hole in the block with its point resting in the groove, as shown in Fig. 2. It is not absolutely necessary that the block I shall be permanently secured to the rod C, as it can be made to operate just the same if not so fastened; but it is better, because it prevents the parts from being separated when not in use, and thus avoids the possibility of the block I becoming detached and mislaid or out of place when wanted. On the rod C is rigidly secured a ratchet-wheel, D, the teeth of which are made nearly in the form of those of a gear-wheel or pinion, so that the pawl $h$ will engage in the spaces between the teeth, and have an equally firm hold whichever way the handle H may be moved, so as to enable the rod C to be turned in either direction with equal certainty, force, and facility. The handle H is secured loosely upon the rod C by being slipped thereon before the block I is put on, the eye of the handle resting on the ratchet-wheel D, and is secured in place by a ring or collar, d, held on the rod C by any suitable means, such as friction, or by a screw-bolt. On the under side of the handle H, directly opposite the ratchet-wheel D, is formed a lug or projection, t, through which is bored a hole in line with the axis of the handle, in which is fitted a sliding bolt or pawl, h, of the proper size to enter the space between teeth of the wheel D, as shown clearly in Fig. 2, this pawl h being connected at its opposite end by a rod, i, to a lever, g, pivoted to the handle H near its outer end, there being a spring, l, interposed between this lever g and the handle H, as shown in Figs. 1 and 2, which operates to hold the pawl h securely in place between the teeth of wheel when the spring is not compressed, but which is withdrawn from contact with the wheel whenever the rear end of lever g is drawn or pressed upward against the handle H. By this arrangement it will be seen that the pawl or locking-bar h has a secure bearing, so as to be held firmly in place, and that when the parts are in the position shown the link or rod i has its joints or ends in a straight line, or so nearly so, between the end of the pawl h and the pivot of lever g, that there is no tendency of the pawl to move backward and release its hold on the wheel D. This enables me to use a comparatively light spring, l, thus making it easier for the hand of the operator to move the lever g, as is necessary at each stroke or movement of the handle H.

It is obvious that some of the details of construction may be varied at the will of the constructor; but I prefer to make the device substantially in the manner above described.

When it is desired to tighten up a wheel, I first provide a supply of washers, W, as shown in Fig. 1, detached. These washers are of the proper size to fit on the tenons of the spokes at their outer ends, and are cut, as shown, so that they can be slipped sidewise thereon by spreading apart the cut ends. These washers may be of good firm leather, preferably soaked in linseed-oil or similar material, to render them as nearly water-proof as possible after they are applied; or they may be made of compressed fiber as the same is now prepared and sold. If too rigid to be opened sufficiently to be slipped into place, they may be cut in halves, as indicated by the dotted line, when the parts can be slipped in from opposite sides. Having a supply of the washers ready, I apply the clamp to one of the spokes of the wheel, as shown in Fig. 1, and then, by means of the handle H and its ratchet, turn the rod C in the proper direction to cause the block I to bear against the inner face of the felly F and press it outward far enough to permit one of the washers W to be inserted between the shoulder on the spoke and the felly. The screw-rod C is then turned back until the block I ceases to bear against the felly, when the clamp is released from the spoke and the felly springs back to its place and tightly clamps the washer between it and the shoulder of the spoke. The device is then applied to another spoke, and the operation repeated until the wheel has been tightened up to the required degree, the number of the spokes to which it will be necessary to apply it depending entirely upon the condition or looseness of the wheel. In some cases three or four spokes will suffice, and in others it may be necessary to operate upon them all. It will be seen that the spokes will be forced to their seat in the hub, if loose therein, with the same pressure that the felly is forced outward. If desired, the clamp may have leather or similar material inserted where it clasps and bears on the spoke, to prevent injuring the same or the paint thereon; but for ordinary use on common farm-wagons this will not be necessary. So, too, by inserting pieces of leather the same clamp may be made to more accurately fit different-sized spokes, from the largest to the smallest, though as a general rule this will not be necessary. By these means I provide a simple cheap device, by which farmers or others can tighten the wheels of their vehicles at home and at any time required and without removing the tire from the wheel or the wheel from the vehicle. Such a device is of special value, also, to parties traveling with wheeled vehicles on the plains, or in arid regions where, as is well known, the wheels are specially liable to be rendered loose by shrinkage of the wood composing the same, as the device can be easily carried along, and be used whenever required.

I am aware that various devices have heretofore been patented for use in tightening tires, and also that various forms of ratchets and pawls have been devised for operating in either direction; but I am not aware of any constructed like mine.

Having thus described my invention, what I claim is—

1. A device for tightening up the wheels of vehicles, the same consisting of a clamp for securing it to a spoke of the wheel, a screw-rod, C, provided with a bearing or push block, I, at its outer end to bear against the felly, and a ratchet-wheel, D, with a handle, H, carrying a spring-pawl, h, and lever g, for operating the same, substantially as and for the purpose set forth.

2. The combination of the clamp A B, the screw-rod C, provided with the ratchet-wheel D, the handle H, secured loosely on said screw-rod and provided with a pawl, h, and lever g, for operating said screw-rod, with a bearing or push block, I, secured loosely to the same, substantially as shown and described.

3. In a tire-tightener, the clamp for securing the tightener to the spoke, consisting of the block A, provided with the arms n, and the adjustable block B, and wedge E, said parts being constructed and arranged to operate substantially as shown and described.

4. In a tire-tightener, the bifurcated push-block I, swiveled upon the screw-rod C, in combination with a clamp adapted to be secured to a spoke of the wheel, substantially as shown and described.

5. In combination with the rod C, having the straight-toothed ratchet-wheel D, rigidly secured thereto, the lever H, journaled on said rod C, and provided with the spring hand-lever g, connected by a link, i, to the pawl h, seated in a lug, t, on the lever H, the said parts being constructed and arranged to operate substantially as shown and described.

CLARENCE D. HAMMON.

Witnesses:
 RICHARD REDHEAD,
 AUGUSTUS MEININGER.